UNITED STATES PATENT OFFICE.

THOMAS JEFFERSON GWIN, OF NEAR BROOKHAVEN, MISSISSIPPI, ASSIGNOR TO NEVIN & BROTHER, OF SAME PLACE.

PROCESS OF CURING SEDGE-GRASS FOR UPHOLSTERY PURPOSES.

SPECIFICATION forming part of Letters Patent No. 451,044, dated April 28, 1891.

Application filed October 20, 1890. Serial No. 368,702. (No specimens.)

*To all whom it may concern:*

Be it known that I, THOMAS JEFFERSON GWIN, a citizen of the United States, residing near Brookhaven, in the county of Lincoln and State of Mississippi, have invented certain new and useful Improvements in Processes of Curing Sedge-Grass for Upholstering Purposes; and I do hereby declare the following to be a full, clear, and exact description of the invention, such as will enable others skilled in the art to which it appertains to make and use the same.

My invention has for its object a process for providing a cheap and convenient substitute for hair, Spanish moss, or other materials now in use in stuffing upholstered articles.

I have discovered that sedge-grass, (*Carex*,) which has a rank offensive odor, if put through a certain process is peculiarly adapted for the purposes above described.

My process consists in cutting the grass when it has grown tough and fibrous, and then subjecting it to a series of alternate dryings and washings, followed by a washing with lime-water and then a final drying, when it is ready for use.

Where there are heavy dews, by allowing the cut grass to remain out in the dew for several nights and exposed to the sun during the day I have found that the first part of my process may be accomplished by taking advantage of natural agencies. These various washings and dryings not only deprive the grass of most of its offensive scent, but also remove the properties of the grass that tend to make it friable, and leave the cured product soft, spongy, and elastic. After gathering it into piles I remove the remaining traces of the disagreeable odor from the grass by sprinkling it well with lime-water, using this instead of the pure water for the final washing. After the final washing the lime from the lime-water is deposited as an exceedingly thin crust on the particles of grass. This crust cracks and breaks off gradually in minute particles when the upholstered article is pressed in any way, as in cushions, mattresses, &c., causing the lime-dust to pass among the interstices of the straw and so keep it fresh and sweet. Moreover, since lime-dust is particularly offensive to ants, bedbugs, and other noxious insects, it has a very beneficial effect in keeping out such insects as are apt to infest the mattresses and other upholstered articles made from hair, cotton, moss, or other like materials.

For this lime wash I use a saturated solution, drawing the water from tanks, where one and one-fourth pound of lime has been added to every gallon of water. After the grass has been again dried it is ready for use for upholstering purposes, forming a durable springy, and cheap substitute for hair, Spanish moss, cotton, and other more expensive materials used for stuffing mattresses, cushions, and other upholstered articles.

Having now described my invention, what I claim, and desire to secure by Letters Patent, is—

The process of preparing sedge-grass (*Carex*) for use for upholstering purposes, wherein the grass is cut when tough and fibrous, then dried, and afterward subjected to a series of washings with water and dryings, followed by a sprinkling with water containing lime in saturated solution, and subsequent drying, as and for the purposes described.

In testimony whereof I affix my signature in presence of two witnesses.

THOMAS JEFFERSON GWIN.

Witnesses:
P. J. NEVIN,
J. K. NEVIN.